United States Patent [19]

Kaye

[11] Patent Number: 5,340,315
[45] Date of Patent: Aug. 23, 1994

[54] METHOD OF TREATING OBESITY

[75] Inventor: Gail L. Kaye, Columbus, Ohio

[73] Assignee: Abbott Laboratories, Abbott Park, Ill.

[21] Appl. No.: 722,438

[22] Filed: Jun. 27, 1991

[51] Int. Cl.$^5$ ............................................. G09B 19/00
[52] U.S. Cl. ................................... 434/127; 514/909; 426/590
[58] Field of Search ................ 434/127; 514/909, 910, 514/911; 426/590, 34, 804

[56] References Cited

U.S. PATENT DOCUMENTS

| | | | |
|---|---|---|---|
| 4,009,265 | 2/1977 | Howard | 514/21 |
| 4,464,122 | 8/1984 | Fuller et al. | 434/127 X |
| 4,576,932 | 3/1986 | Sorbini | 514/54 |
| 4,895,845 | 1/1990 | Seed | 514/252 |
| 4,951,197 | 8/1990 | Mellinger | 364/413.01 X |
| 4,976,622 | 12/1990 | Clark | 434/238 X |
| 5,044,958 | 9/1991 | Robertson et al. | 434/127 |
| 5,104,676 | 4/1992 | Mahmoud et al | 426/590 |

OTHER PUBLICATIONS

C & P Telephone, "Yellow Pages", Jan. 1991, pp. 2124–2125.
Diet Nutrition & Cancer Prevention: The Good News, National Institute of Health Publication No. 87-2878, is discussed beginning at page 1.
"Position of the American Dietetic Association: Health Implications of Dietary Fiber", Journal of American Dietetic Association, vol. 88: 217–221 (1988).
Diet and Health, Implications For Reducing Chronic Disease Risk, National Academy Press, (1989).
The Surgeon General's Report on Nutrition and Health, U.S. Government Printing Office, (1988).
The Multidimensional Self-Esteem Inventory, by E. J. O'Brien, Ph.D. and S. Epstein, Ph.D.
Metropolitan Life Insurance Co., height and weight tables.
Nutrition Guide For Professionals, edited by M. A. Powers.
Exchange Lists For Meal Planning, American Diabetes Association, Inc. The American Dietetic Association, (1986.
Recommended Dietary Allowances, National Academy Press, (1989).

*Primary Examiner*—Richard J. Apley
*Assistant Examiner*—Karen A. Jalbert
*Attorney, Agent, or Firm*—Lonnie R. Drayer; Donald O. Nickey

[57] ABSTRACT

A method of treating obesity comprises a screening phase, a reducing phase, an adaptive phase and a sustaining phase. The reducing and adapting phases involve the consumption of a weight loss beverage as a meal substitute for some meals. The method of treatment involves not only nutrition, but also instruction and involvement in exercise and personal effectiveness.

18 Claims, No Drawings

METHOD OF TREATING OBESITY

The present invention relates generally to a method of treating obesity and more specifically to a method of treating obesity employing a multidisciplinary program.

A method of treating obesity according to the present invention is applicable to persons who are either moderately overweight (less than 30% over their ideal body weight) or grossly overweight and desirous of losing weight but do not wish to participate in a very low calorie diet program. The method of treatment disclosed herein facilitates not only short term weight control but also long term weight maintenance. One objective of the new method of treating obesity is to establish good nutritional behavior by a person being treated. Another objective of the new method of treating obesity is to establish healthy exercise habits by a person being treated. Another objective of the new method of treating obesity is to establish healthy personal effectiveness behavior by a person being treated. While there are many "weight loss programs" available to an obese person, the inventor is not aware of any of these "programs" which attain all of the foregoing objectives in the manner of treatment disclosed herein.

The method of treating obesity disclosed herein comprises four phases: (a) a screening phase; (b) a reducing phase; (c) an adapting phase; and (d) a sustaining phase.

The screening phase involves determining the suitability of an obese person for the new method of treating obesity. Medical, exercise and psychosocial evaluations of the obese person are performed. The person who wishes to be treated for obesity in the manner described herein is required to obtain an opinion from a physician that he or she has no medical contraindications for being treated for obesity in the manner described herein.

The person who wishes to be treated for obesity in the manner described herein is required to be evaluated by a behavioral counselor, (preferably having at least a masters degree in psychology, counseling or social work) to establish with reasonable certainty that the person does not have a gross personality disorder or a behavioral eating disorder such as anorexia, bulimia or an obsessive compulsive disorder manifested by compulsive overeating. The method of treating obesity disclosed herein is not intended for persons exhibiting such behavioral problems. In order to customize the treatment for a particular person it is preferred that the personal effectiveness assessment include a written test such as the "Multidimensional Self-Esteem Inventory" which is available from Psychological Assessment Resources, Inc. of Adessa, Fla.

The person who wishes to be treated for obesity in the manner described herein is required to undergo an exercise assessment by a qualified exercise specialist (preferably having at least a masters degree in physical education or exercise physiology) to determine the persons physical status in the areas of strength, flexibility and endurance. It is preferred that this assessment include the Rockport Fitness Walking Test, sit-ups, push-ups, and so forth. The exercise assessment will facilitate the customizing of the exercise portions of the treatment for each person.

Preferably, the screening phase will also include an assessment of the nutritional habits of the person who wishes to be treated. This may be accomplished by requiring the person to keep a food diary for four days, and then having a qualified nutritionist evaluate the contents of the food diary.

A goal weight for the person to be treated is determined, preferably by using a sex, height and ideal weight table published by the Metropolitan Life Insurance Company. An appropriate daily caloric intake for the person to lose one to two pounds per week is established, preferably by using the method described in "A GUIDE FOR PROFESSIONALS: THE EFFECTIVE APPLICATION OF EXCHANGE LISTS FOR MEAL PLANNING", American Diabetes Association, Inc. and the American Dietetics Association (1977).

The reducing phase involves providing instruction to the obese person regarding nutrition, exercise and personal effectiveness as well as instructing the person being treated to restrict his or her food consumption to a weight control beverage and a meal having only a predetermined number of calories. The obese person is provided instruction regarding dietary guidelines, meal planning principles and strategies for dining outside of his or her home.

In the preferred embodiment the person being treated is provided instruction regarding the exchange system of the American Dietetic and American Diabetes Associations. While developed primarily for persons with diabetes and others who must follow special diets this exchange system is based upon principles of good nutrition that apply to nearly everyone. The nutrient values for the food exchanges are set forth in TABLE I.

TABLE I

| Exchange List | Carbohydrate (grams) | Protein (grams) | Fat (grams) | Calories |
|---|---|---|---|---|
| Starch/Bread | 15 | 3 | trace | 80 |
| Meat | | | | |
| Lowfat | — | 7 | 3 | 55 |
| Medium-Fat | — | 7 | 5 | 75 |
| High-Fat | — | 7 | 8 | 100 |
| Vegetable | 5 | 2 | — | 25 |
| Fruit | 15 | — | — | 60 |
| Milk | | | | |
| Skim | 12 | 8 | trace | 90 |
| Lowfat | 12 | 8 | 5 | 120 |
| Whole | 12 | 8 | 8 | 150 |
| Fat | — | — | 5 | 45 |
| Free Foods | — | — | — | 0 |
| Combination Foods | varies | varies | varies | varies |

The obese person is provided with lists of foods and serving sizes that fall into each of the exchanges. Foods in the starch and bread exchange are rich in complex carbohydrate, the human body's preferred source of energy. Foods in the meat exchange are divided into three groups based upon fat content per serving. Meats are an excellent source of high-quality protein, iron, phosphorus, vitamin $B_{12}$, niacin, thiamin ($B_6$) and many trace nutrients. Foods in the vegetable exchange provide the least number of calories per serving of all of the exchange groups, because vegetables contain so much water. Vegetables vary greatly in nutrient content. Dark green and deep yellow vegetables are especially rich in vitamins and minerals. Foods in the fruit exchange are excellent sources of simple and complex carbohydrate, fiber, vitamins C and A, and potassium and many other minerals. The water content of fruits causes great variation in the portion size of this exchange. Foods in the milk exchange are also divided into three groups based upon fat content. Preferably the food consumption of the obese person is restricted to foods from the very-lowfat-milk group. Foods in the fat exchange are divided into saturated and unsaturated groups. Fat consumption must be strictly regulated because fat is a concentrated source of calories. Foods in the free food exchange provide fewer than 20 calories per serving. Foods in the combination exchange each fall into two or more of the other exchanges. A listing of food exchanges which are suitable for use in the present method of treating obesity has been published by the American Diabetes Association/American Dietetic Association with a copyright date of 1986, and is incorporated herein by reference for the purpose of teaching a food exchange system that may be used in the practice of the present invention.

During the reducing phase the person being treated will be instructed to consume two servings of a weight control product and one meal per day. If the desired caloric intake for the obese person is over 1,200 calories per day then three servings of a weight control product and one meal are to be consumed per day.

A weight control beverage used in the practice of the present invention should be formulated such that one serving of the beverage acts as a meal replacement and provides at least one-third of the United States Recommended Daily Allowance (US RDA) for protein, minerals and vitamins, one-third of the recommended minimum daily intake for fiber, and about 240 calories. Preferably the fiber source in the weight control beverage provides both soluble and insoluble, and both fermentable and non-fermentable fiber. Preferably the weight control beverage is a powder which is reconstituted with water, and the powder is agglomerated to facilitate reconstitution without an electric food blender. Preferably each serving of a weight control beverage used in the practice of the present invention may be integrated into the food exchange for one bread exchange, two lean meat exchanges, and one fruit exchange. An example of a weight control product which may be used in the practice of the present invention is the subject of U.S. Pat. No. 5,014,676 which was filed at the U.S. Patent Office on the same date as this patent application. The nutritional profile of the weight control product used in practicing the best mode of the present invention is set forth in TABLE II.

TABLE II

NUTRITIONAL INFORMATION FOR ONE SERVING OF NEW PRODUCT

|  |  |  | Percent of U.S. RDA |
|---|---|---|---|
| Serving Size: | 67.0 g | for Vanilla Flavored Product. | |
|  | 71.0 g | for Chocolate Flavored Product. | |
| Calories | 240 | | |
| Protein | 16 g | | |
| Fat | 6 g | | |
| Carbohydrate | 30 g | | |
| Dietary Fiber | 7 g | | |
| Sodium | 500 mg | | |
| Potassium | 750 mg | | |
| Vitamin A | 1750 IU | | 35 |
| Vitamin C | 21 mg | | 35 |
| Thiamine (Vitamin B1) | 0.53 mg | | 35 |
| Riboflavin (Vitamin B2) | 0.60 mg | | 35 |
| Niacin | 7.0 mg | | 35 |
| Calcium | 350 mg | | 35 |
| Iron | 6.3 mg | | 35 |
| Vitamin D | 140 IU | | 35 |
| Vitamin E | 10.5 IU | | 35 |
| Vitamin B6 | 0.7 mg | | 35 |
| Folic Acid | 140 mcg | | 35 |
| Vitamin B12 | 2.1 mcg | | 35 |
| Phosphorus | 350 mg | | 35 |
| Iodine | 52.5 mcg | | 35 |
| Magnesium | 140 mg | | 35 |
| Zinc | 5.3 mg | | 35 |
| Copper | 0.7 mg | | 35 |
| Biotin | 105 mcg | | 35 |
| Pantothenic acid | 3.5 mg | | 35 |
| Chloride | 775 mg | | 35 |
| Manganese* | 1.3 mg | | — |
| Vitamin K* | 27 mcg | | — |
| Selenium* | 24 mcg | | — |
| Chromium* | 26 mcg | | — |
| Molybdenum* | 50 mcg | | — |

*No U.S. RDA has been established, but these levels do meet the recommendations of other organizations.

The ingredients for making a two thousand pound batch of a chocolate flavored weight control product suitable for practicing the method of treating obesity of the invention are listed in TABLE III, and the ingredients for making a two thousand pound batch of a vanilla flavored weight control product are listed in TABLE IV.

TABLE III

INGREDIENTS FOR 2,000 POUND BATCH OF CHOCOLATE FLAVORED PRODUCT

| INGREDIENT | QUANTITY |
|---|---|
| Base Powder (Spray Dried, 3% Moisture) | 999.20 lb |
| High Oleic safflower Oil | 167.305 lb |
| Soy Lecithin | 1.707 lb |
| Monoglycerides | 1.707 lb |
| Vitamin D3 | 1.028 g |
| Vitamin K | 0.258 g |
| Non-Fat Dry Milk | 774.204 lb |
| Minerals | 57.101 lb |
|    Magnesium Chloride | 19.693 lb |
|    Sodium Chloride | 7.623 lb. |
|    Sodium Citrate | 14.769 lb |
|    Potassium Citrate | 12.237 lb |
|    Dipotassium Phosphate | 2.779 lb |
| Potassium Iodide | 0.8258 g |
| Premix containing trace minerals and ultratrace minerals | 1382.451 g |
|    Zinc Sulfate | 282.8495 g |
|    Ferrous Sulfate | 272.3429 g |
|    Manganese Sulfate | 74.8182 g |
|    Copper Sulfate | 40.3676 g |
|    Sodium Molybdate | 2.0391 g |
|    Chromium Chloride | 1.9841 g |
|    Sodium selenite | 0.7722 g |
|    Sucrose-diluent | 621.8265 g |
| Citric Acid | 85.3249 g |
| Vitamin Premix | 2553.77 g |
|    Ascorbic acid | 1117.27 g |
|    dl Alpha Tocopheryl Acetate | 191.53 g |
|    Niacinamide | 105.34 g |
|    d-Calcium Pantothenate | 60.65 g |
|    Vitamin A Palmitate | 18.45 g |
|    Pyridoxine Hydrochloride | 12.77 g |
|    Thiamine Mononitrate | 9.60 g |
|    Riboflavin | 9.58 g |
|    Folic Acid | 3.192 g |
|    Biotin | 2.043 g |
|    Phylloquinone | 0.112 g |
|    Vitamin D3 | 0.0359 g |
|    Cyanocobalamin | 0.0319 g |
| Flavoring Ingredients | |
|    Natural and Artificial | 10.554 lb |

TABLE III-continued

INGREDIENTS FOR 2,000 POUND BATCH OF CHOCOLATE FLAVORED PRODUCT

| INGREDIENT | QUANTITY |
| --- | --- |
| Chocolate Flavor | |
| Ethyl Vanillin | 254.92 g |
| Artificial Vanilla Flavor | 166.02 g |
| Aspartame | 638.67 g |
| Sucrose | 450.34 lb |
| Total Milk Protein Isolate | 208.28 lb |
| Fiber System | 211.08 lb |
| Oat hull fiber | 105.54 lb |
| Gum Arabic | 84.44 lb |
| Sodium carboxymethylcellulose | 21.10 lb |
| Dutch Process Cocoa | 112.58 lb |
| Processing Aids | |
| Hydrogen Peroxide | |
| Enzyme Lactase | |
| 45% Potassium Hydroxide | |
| Citric Acid | |

TABLE IV

INGREDIENTS FOR 2,000 POUND BATCH OF VANILLA FLAVORED PRODUCT

| INGREDIENT | QUANTITY |
| --- | --- |
| Base Powder (Spray Dried, 3% Moisture) | 1062.00 lb |
| High Oleic Safflower Oil | 177.820 lb |
| Soy Lecithin | 1.815 lb |
| Monoglycerides | 1.815 lb |
| Vitamin D3 | 1.093 g |
| Vitamin K | 0.274 g |
| Non-Fat Dry Milk | 822.863 lb |
| Minerals | 60.687 lb |
|   Magnesium Chloride | 20.930 lb |
|   Sodium Chloride | 8.102 lb |
|   Sodium Citrate | 15.698 lb |
|   Potassium Citrate | 13.003 lb |
|   Dipotassium Phosphate | 2.954 lb |
|   Potassium Iodide | 0.8777 g |
| Premix of trace minerals | 1469.338 g |
| and ultratrace minerals | |
|   Zinc Sulfate | 300.6266 g |
|   Ferrous Sulfate | 289.4596 g |
|   Manganese Sulfate | 79.5206 g |
|   Copper Sulfate | 42.9047 g |
|   Sodium Molybdate | 2.1673 g |
|   Chromium Chloride | 2.1088 g |
|   Sodium Selenite | 0.8208 g |
|   Sucrose-diluent | 660.9082 g |
|   Citric Acid | 90.6875 g |
| Vitamin Premix | 2714.34 g |
| Ascorbic acid | 1187.52 g |
| dl Alpha Tocopheryl Acetate | 203.58 g |
| Niacinamide | 111.97 g |
| d-Calcium Pantothenate | 64.47 g |
| Vitamin A Palmitate | 19.61 g |
| Pyridoxine Hydrochloride | 13.57 g |
| Thiamine Mononitrate | 10.21 g |
| Riboflavin | 10.18 g |
| Folic Acid | 3.393 g |
| Biotin | 2.171 g |
| Phylloquinone | 0.119 g |
| Vitamin D3 | 0.0382 g |
| Cyanocobalamin | 0.0339 g |
| Flavoring Ingredients | |
| Artificial Vanilla Flavor | 2714.34 g |
| Ethyl Vanillin | 271.25 g |
| Aspartame | 475.37 g |
| Sucrose | 478.65 lb |
| Total Milk Protein Isolate | 221.37 lb |
| Fiber System | 224.37 lb |
| Oat hull fiber | 112.18 lb |
| Gum Arabic | 89.75 lb |
| Sodium carboxymethylcellulose | 22.44 lb |
| Processing Aids | |
| Hydrogen Peroxide | |
| Enzyme Lactase | |
| 45% Potassium Hydroxide | |

TABLE IV-continued

INGREDIENTS FOR 2,000 POUND BATCH OF VANILLA FLAVORED PRODUCT

| INGREDIENT | QUANTITY |
| --- | --- |
| Citric Acid | |

The first step in the process of manufacturing a weight control product suitable for use in the treatment for obesity according to the invention is to manufacture the base powder.

An oil blend is prepared by placing the high oleic safflower oil in a kettle and heating the oil to a temperature in the range of 140° to 150° F. while agitating the oil. The soy lecithin and monoglycerides are then added to the heated oil, and the blend is agitated well until the emulsifiers are dissolved. The Vitamin D3 and Vitamin K are added to the blend, and the blend is maintained at a temperature in the range of 140° to 150° F. under agitation until it is added to a nonfat milk slurry.

The main ingredient of the base powder is either non-fat dry milk or condensed skim milk (substituted at an equivalent quantity of total solids) which is hydrolyzed by enzyme lactase to reduce the lactose content to a level that is tolerable by lactose-intolerant individuals. The non-fat dry milk, or condensed skim milk, may be of either the "low-heat" or "high-heat" type. Preferably the non-fat dry milk, or condensed skim milk, is of the "low-heat" type because it provides enhanced functional and organoleptic properties.

Prior to dissolving the non-fat dry milk, about 2,600 pounds of processing water is heated to be in the range of 80°–100° F., preferably 80° to 85° F. Hydrogen peroxide is added to the water, or to the milk, to inhibit microbial growth during the lactose hydrolysis of the milk. The usage level of hydrogen peroxide may vary from 30 to 70 parts per million (ppm) depending upon the desired length of the time for hydrolysis of the lactose in the non-fat milk. For a short hydrolysis time of about four hours a hydrogen peroxide concentration of 30–40 ppm is recommended. For a longer hydrolysis time, as in the preferred method, of about fourteen to eighteen hours, a hydrogen peroxide concentration of 50–70 ppm is recommended. The non-fat dry milk is dissolved in water using agitation to form a slurry at a concentration of about 35% to about 45%, most preferably about 39% total solids by weight. After the non-fat milk has been completely dissolved in the water, the pH of the slurry is adjusted to be in the range of 6.4–6.6, preferably 6.5. It is usually necessary to raise the pH of the slurry by adding a suitable amount of a potassium hydroxide solution to the slurry. However, if too much potassium hydroxide is used and the pH of the slurry needs to be lowered, a citric acid solution may be added to the slurry.

Enzyme lactase is then added to the non-fat milk slurry. The amount of enzyme lactase which is used depends upon the desired degree of lactose hydrolysis and the desired length of time for the lactose hydrolysis. For a short hydrolysis time of about four hours, an enzyme lactase usage level of about 4–5 g of enzyme per pound of milk solids and a hydrolysis temperature of about 90° to 100° F. is recommended. In a preferred embodiment using a hydrolysis time of about fourteen to eighteen hours, an enzyme lactase level of about 1.5–2.5 g per pound of milk solids and a hydrolysis temperature of 80° to 85° F. is preferred. The foregoing hydrolysis conditions result in a minimum of 70% lactose hydrolysis in the non-fat milk. The completion of the enzymatic hydrolysis is determined by ascertaining the level of residual lactose in the non-fat milk. The level of residual lactose can be determined by using chromatographic or enzymatic assay methods, for example the Boehringer Mannheim method for the determination of lactose and D-galactose in foodstuffs, Catalog Number 176303 of Boehringer Mannheim, Indianapolis, Ind. U.S.A.

The oil blend is added to the non-fat milk slurry. The slurry is then heated to a temperature in the range of 145° to 150° F. to inactivate the enzyme lactase. The slurry is homogenized, preferably using a two-stage homogenizer at 3,000±100 psig at the first stage and 500±100 psig at the second stage, then pasteurized (165°–175° F. for 16 seconds) and then cooled to 38°–44° F. and held at this temperature under agitation.

The minerals are then dissolved with agitation in about 500 pounds of water at a temperature in the range of 140° to 150° F. in the following order: magnesium chloride, sodium chloride, sodium citrate, potassium citrate and dipotassium phosphate. The solution containing the minerals is then added to the slurry with rapid agitation.

The potassium iodide is then dissolved in about 100 pounds of water at a temperature in the range of 80° to 110° F. Next, the premix of trace minerals and ultratrace minerals is dissolved in the potassium iodide solution with agitation. The resultant solution is then added to the slurry with agitation. After ten minutes of agitation the pH of the slurry is checked. The pH of the slurry should be in the range of 6.40 to 6.90. If necessary the pH of the slurry is adjusted to be in the specified range using potassium hydroxide or citric acid as described above.

The slurry is then spray dried to produce the base powder.

The base powder is dry blended with the remaining ingredients. In a preferred embodiment about twenty pounds of the base powder is dry blended with the vitamin premix and the flavoring ingredients. (In the case of the chocolate flavored product, the Dutch Process Cocoa is not included in this step as a flavoring ingredient.) The product of this step is then added to the remainder of the base powder. The sucrose, total milk protein isolate, fiber system, and in the case of the chocolate flavored product the Dutch Process Cocoa, are then dry blended with the base powder. It is understood that the sucrose may be partially or completely replaced by a starch hydrolysate (e.g. corn syrup solids or maltodextrins) having a dextrose equivalent of 10–25, without departing from the scope of the present invention. While the components of the fiber system (oat hull fiber, gum arabic and sodium carboxymethylcellulose) have only been added to the dry blend individually thus far, it is believed that no adverse effects would be experienced if the components of the fiber system would first be dry blended together and then be dry blended with the base powder and other ingredients.

For ease of dispersibility upon reconstitution with water, the dry blended product is agglomerated. The preferred method of agglomeration is a fluidized bed agglomeration process in which the rewetted powder particles are suspended in air in such a way that the process promotes rapid and complete agglomeration in a very small space. In the preferred embodiment the agglomerated particles should be of a size having a loose bulk density in the range of 0.25–0.33 g/cc and a moisture content in the range of 3% to 5%.

The agglomerated powder is then packaged in nitrogen-flushed single serving pouches or any other suitable containers, preferably with an oxygen level below 2%.

The weight control product may be reconstituted by mixing one packet of the product with eight fluid ounces of water.

In each serving of the preferred weight control beverage the percentage of calories contributed by protein, carbohydrate and fat are about 25% to 30%, about 45% to 55% and about 20% to 30%, respectfully, and most preferably 27%, 50.5% and 22.5%, respectively. Current recommendations of the American Heart Association are for carbohydrate to provide 50% to 55%, and fat no more than 30%, respectively, of total calories. The preferred weight control beverage meets the American Heart Association recommendations for percentages of calories provided by carbohydrate and fat. The percentage of calories provided by protein is higher than that recommended in diets for weight maintenance. This is necessitated by the fact that for diets low in calories to meet the protein intakes recommended by National Academy of Sciences, National Research Council's Recommended Dietary Allowances (NAS-NRC RDA's) of 58 to 63 grams per day for men and 46 to 50 grams per day for women, the percentage of total calories provided by protein must be disproportionately high. However, when the preferred weight loss beverage is used in the method of treatment disclosed herein, the profile of the overall diet or the person being treated more closely approximates the recommended patterns, especially for person's on higher caloric intakes. The preferred weight control beverage was developed with these recommendations in mind.

The Committee on Diet and Health, Food and Nutrition Board, Commission on Life Sciences, National Research Council recently issued dietary recommendations and summarized those of other expert groups (Diet and Health: Implications for Reducing Chronic Disease Risk, 1989). Among other guidelines, the committee recommended a reduction in total fat intake to 30% or less of total calories, a reduction in saturated fatty acid intake to less than 10% of total calories and a reduction in cholesterol intake to less than 300 mg per day. In its summary of recommendations of other expert groups, the committee noted the most consistent recommendation for the general population was to limit the intake of total fat to less than, but approximating, 30% of total calories. Other common suggestions were a reduction in saturated fatty acid intake, usually to less than 10% of total calories, and an intake of polyunsaturated fatty acids not to exceed 10% of total calories. The level and source of fat in the weight control product of the present invention meet these guidelines.

At least ⅓ of the US RDA for protein, minerals and vitamins is met per serving in the preferred weight control beverage.

The United States Food and Drug Administration (FDA), the United States Department of Health and Human Services (DHHS) and the American Dietetic Association (ADA) recommend a range of daily fiber intake of 20 to 35 grams per day. An important feature of the preferred weight control beverage is that it contains sufficient fiber to enable a user of the product to meet the recommended daily fiber intake while following a calorie restricted diet. Seven grams dietary fiber per serving are provided in the weight control product of the invention to assist persons using the preferred weight control beverage in meeting the minimum recommended daily dietary fiber intake of 20 to 35 grams. It is often difficult to meet this recommendation on calorie-restricted diets. By providing 14 grams in 2 servings (70% of the minimum recommended intake), the person being treated and consuming the preferred weight control beverage has a better chance of consuming the daily recommended amount of dietary fiber under the volume restrictions of a reduced calorie diet. The blend of dietary fibers in the weight control product of the present invention provides a ratio of soluble to insoluble dietary fiber of approximately 50/50. During the reducing phase the obese person should be provided with instruction about strategies for dining in restaurants such that foods which fit into the desired food exchanges are selected.

During the reducing phase the obese person is provided with educational information, preferably both in printed form and verbally, and preferably with instruction, and most preferably is involved in group activities, relating to exercise. The exercise activity should be suited to the physical condition of the obese person. The obese person should be provided with information about endurance exercises (such as cycling, walking and cross-country skiing), flexibility exercises (such as water workouts and lower back exercises), and strength training exercises.

During the reducing phase the person being treated is provided with educational information, preferably with both printed materials and verbal instruction, and most preferably is involved in group activities relating to personal effectiveness. The obese person should be provided with information about behavior modification techniques, stress management techniques and relapse management. Because overeating is a maladaptive coping response it is imperative that the obese person be provided with information about how to cope with stress in a means other than overeating. Information about relapse management at this early stage of the treatment process includes such items as: effective communication and weight control; assertiveness; building support systems; enhancing self esteem; handling emotions; and building a positive body image.

In a preferred embodiment of the invention the person being treated attends weekly group sessions during the reducing phase. In a most preferred embodiment the total length of time for a weekly group session is about 1½ hours, which includes two 45 minute sessions. During one of the 45 minute sessions there are 10–15 minute exercise lectures and demonstrations, with actual exercise activity during the remaining 30–35 minutes. During the other 45 minute session information about nutrition and/or personal effectiveness skill building activities are presented and discussed. Problem solving and goal setting occurs on a weekly basis during the last 20 minutes of the group session.

All of the educational components of the treatment method should be designed to facilitate skills acquisition. The educational components relating to nutrition and personal effectiveness should cover: objectives, assessment, content and activities to apply what is learned. The educational component relating to exercise should cover: content, an exercise assignment for the following week, and an in-class exercise to be done during the actual group session.

When the person being treated attains his or her goal weight the adapting phase of the method of treatment is begun. During the adapting phase the person being treated is instructed to progressively decrease consumption of the weight control product and progressively increase the number of meals consumed daily. In a preferred embodiment of the method of treatment the adapting phase lasts 8 weeks. During the fist two weeks the person being treated is instructed to consume one serving of the weight control beverage an two meals per day. During the eight weeks the person being treated is instructed to eat three meals per day, and the caloric intake level and body weight of the person are closely monitored to fine-tune the persons food intake for maintaining the goal weight. An appropriate caloric intake for weight maintenance is determined, and the person being treated is provided with information regarding menu planning, food shopping, convenience foods, alcohol, and cultural cuisine. During the adaptive phase the person being treated continues the exercise program begun during the reducing phase, and should be encouraged to use the skills relating to relapse management which were taught during the reducing phase. Preferably, during the adaptive phase the person being treated continues to attend the weekly group sessions described above.

The next phase of the method of treatment is the sustaining phase. During the sustaining phase the person being treated is encouraged to practice the skills relating to weight maintenance which were taught during the previous phases. During the sustaining phase the person being treated preferably attends group sessions biweekly for two months and then monthly for four months.

There are five important advantages to the method of treating obesity according to the present invention:

(1) The person being treated is taught "how to" do what is being prescribed to manage his or her weight. This skills approach occurs in the three treatment components of nutrition, exercise and personal effectiveness.

(2) The person being treated actually engages in and learns actual exercise activities during the weekly group sessions, and is instructed about a structured exercise program, preferably walking, to follow outside of the weekly group session.

(3) The person being treated is taught skills which should help him or her to cope with the psychosocial ramifications of behavior change, such as how to cope with the outcomes of changes in roles, relationships, and routines that may occur as a result of making behavior changes.

(4) The person being treated is taught relapse management skills throughout the course of the treatment.

(5) In a preferred embodiment the person being treated participates in problem solving and goal setting on a weekly basis as part of a group session.

In clinical trials the persons who were treated for obesity with the method described herein, for whom data was available at the time of filing a U.S. Patent Application, have lost an average of one to two pounds of weight per week during the reducing phase, and 98% of those persons for whom data was available indicate that they have changed some of their day-to-day behavior as a result of treatment.

While certain representative embodiments and details have been described for the purpose of illustrating the invention, it will be apparent to those skilled in the art that various changes and modifications may be made therein without departing from the spirit or scope of the invention.

I claim:

1. A method of treating obesity comprising the steps of:
   (a) subjecting an obese person to medical, exercise, and psychosocial evaluations, and establishing a goal weight for said obese person;
   (b) thereafter instructing said obese person regarding nutrition, exercise and personal effectiveness, and instructing said obese person to consume a weight control beverage and only one meal per day until said goal weight has been attained, one serving of the weight control beverage acting as a meal replacement and providing at least one-third of the U.S. RDA for protein, minerals and vitamins, one-third of the recommended daily intake for fiber, and about 240 calories, said weight control beverage containing a blend of dietary fibers containing oat hull fiber, gum arabic and sodium carboxymethylcellulose, said blend of dietary fibers providing both soluble and insoluble and both fermentable and non-fermentable fiber, the ratio of soluble to insoluble dietary fiber being approximately 50/50, said weight control beverage being integratable into a food exchange as one bread exchange, two lean meat exchanges and one fruit exchange;
   (c) determining that the person being treated for obesity has reached the goal weight established in step (a), and thereafter instructing the person being treated for obesity to alter food consumption to be two meals a day plus the weight control beverage for a period of about two weeks, and after the two week period instructing the person being treated for obesity to alter food consumption to be three meals per day while continuing to monitor caloric intake and body weight to establish a caloric intake for maintaining the goal weight established in step (a); and
   (d) thereafter monitoring the weight of the person being treated for obesity less frequently while the person practices the skills relating to weight maintenance which were taught to the person being treated for obesity during in steps (b) and (c).

2. A method of treating obesity as described in claim 1 wherein step (a) further comprises establishing an appropriate caloric intake for the person being treated for obesity to lose weight at a rate of one to two pounds per week.

3. A method of treating obesity as described in claim 2 wherein steps (b), (c) and (d) further comprise instructing the person being treated for obesity regarding nutrition, exercise and personal effectiveness during group sessions attended by other persons being treated for obesity.

4. A method of treating obesity as described in claim 3 wherein the group sessions are held weekly.

5. A method of treating obesity as described in claim 2 wherein in steps (b) and (c) the weight control beverage comprises a powder which is reconstituted in water.

6. A method of treating obesity as described in claim 1 wherein step (c) further comprises instructing the person being treated for obesity regarding nutrition, exercise and personal effectiveness.

7. A method of treating obesity as described in claim 6 wherein steps (b), (c) and (d) further comprise instructing the person being treated for obesity regarding nutrition, exercise and personal effectiveness during group sessions attended by other persons being treated for obesity.

8. A method of treating obesity as described in claim 7 wherein the group sessions are held weekly.

9. A method of treating obesity as described in claim 6 wherein in steps (b) and (c) the weight control beverage comprises a powder which is reconstituted in water.

10. A method of treating obesity as described in claim 1 wherein steps (b), (c) and (d) further comprise instructing the person being treated for obesity regarding nutrition, exercise and personal effectiveness during group sessions attended by other persons being treated for obesity.

11. A method of treating obesity as described in claim 10 wherein the group sessions are held weekly.

12. A method of treating obesity as described in claim 1 wherein in steps (b) and (c) the weight control beverage comprises a powder which is reconstituted in water.

13. A method of treating obesity as described in claim 12 wherein in steps (b) and (c) the percentage of calories in said weight control beverage contributed by protein, carbohydrate and fat are about 25% to 30%, about 45% to 55% and about 20% to 30%, respectfully.

14. A method of treating obesity as described in claim 13 wherein in steps (b) and (c) said weight control beverage contains a milk product in which the lactose content has been reduced to a level that is tolerable by lactose-intolerant individuals.

15. A method of treating obesity as described in claim 12 wherein in steps (b) and (c) said weight control beverage contains a milk product in which the lactose content has been reduced to a level that is tolerable by lactose-intolerant individuals.

16. A method of treating obesity as described in claim 1 wherein in steps (b) and (c) the percentage of calories in said weight control beverage contributed by protein, carbohydrate, and fat are about 25% to 30%, about 45% to 55% and about 20% to 30%, respectfully.

17. A method of treating obesity as described in claim 16 wherein in steps (b) and (c) said weight control beverage contains a milk product in which the lactose content has been reduced to a level that is tolerable by lactose-intolerant individuals.

18. A method of treating obesity as described in claim 1 wherein in steps (b) and (c) said weight control beverage contains a milk product in which the lactose content has been reduced to a level that is tolerable by lactose-intolerant individuals.

* * * * *